US 11,001,138 B2

(12) United States Patent
Kim (10) Patent No.: US 11,001,138 B2
(45) Date of Patent: May 11, 2021

(54) FILL LIMIT VENT VALVE FOR FUEL TANK

(71) Applicant: Nifco Korea Inc., Chungcheongnam-do (KR)

(72) Inventor: Jeong Hoon Kim, Chungcheongnam-do (KR)

(73) Assignee: NIFCO KOREA INC., Chungcheongnam-Do (KR)

( * ) Notice: Subject to any disclaimer, the term of this patent is extended or adjusted under 35 U.S.C. 154(b) by 0 days.

(21) Appl. No.: 16/326,337

(22) PCT Filed: Jul. 31, 2017

(86) PCT No.: PCT/KR2017/008232
§ 371 (c)(1),
(2) Date: Feb. 18, 2019

(87) PCT Pub. No.: WO2018/034448
PCT Pub. Date: Feb. 22, 2018

(65) Prior Publication Data
US 2019/0210453 A1   Jul. 11, 2019

(30) Foreign Application Priority Data

Aug. 18, 2016   (KR) ........................ 10-2016-0104998

(51) Int. Cl.
*B60K 15/035* (2006.01)
*B60K 15/077* (2006.01)
(Continued)

(52) U.S. Cl.
CPC ............ *B60K 15/035* (2013.01); *B60K 15/03* (2013.01); *B60K 15/077* (2013.01); *F16K 27/00* (2013.01);
(Continued)

(58) Field of Classification Search
CPC .... B60K 15/03; B60K 15/035; B60K 15/077; B60K 15/03504; B60K 15/03519;
(Continued)

(56) References Cited

U.S. PATENT DOCUMENTS 5,044,389 A * 9/1991 Gimby ............. B60K 15/03519
137/39
5,797,434 A * 8/1998 Benjey ............. B60K 15/03519
137/202
(Continued)

FOREIGN PATENT DOCUMENTS

JP   H07-002685 U   1/1995
JP   2014088126 A   5/2014
(Continued)

*Primary Examiner* — Craig J Price
(74) *Attorney, Agent, or Firm* — Kacvinsky Daisak Bluni, PLLC (57) ABSTRACT

It is disclosed a FLVV including: an upper cover provided in the fuel tank, and having an outlet duct; a casing coupled to the upper cover; the float, which is elastically provided inside the casing so as to be movable upward and downward, has a first valve seat provided on the upper surface of one side thereof so as to open and close a first outlet port by principle of a lever, and has a recessed surface formed at one side of the upper surface thereof; the plate elastically provided by a second spring at the recessed surface formed at the float, so as to open and close a second outlet port while moving upward and downward; and a lower cover closing the lower part of the casing and having the float elastically provided by a first spring.

5 Claims, 10 Drawing Sheets

(51) Int. Cl.
*F16K 31/18* (2006.01)
*F17C 13/04* (2006.01)
*F16K 27/00* (2006.01)
*B60K 15/03* (2006.01)

(52) U.S. Cl.
CPC .............. *F16K 31/18* (2013.01); *F17C 13/04* (2013.01); *B60K 15/03519* (2013.01); *B60K 2015/03289* (2013.01); *B60K 2015/03388* (2013.01); *Y10T 137/0874* (2015.04); *Y10T 137/3099* (2015.04)

(58) Field of Classification Search
CPC .... B60K 15/03289; B60K 2015/03388; B60K 2015/03289; F16K 24/04; F16K 24/06; F16K 24/044; F16K 27/07; F16K 31/18; F16K 33/00; F16K 24/042; F16K 17/36; F16K 31/28; F16L 47/02; F16L 47/14; F02M 37/017; F02M 37/0076; Y10T 137/0874; Y10T 137/3099; Y10T 137/077; Y10T 137/86324; Y10T 137/7404; F17C 13/04
USPC ..... 137/15.26, 38, 39, 43, 315.08, 409, 429, 137/430, 587, 588; 220/86.2, 745, 746; 141/59, 198, 202, 229; 123/516, 518, 123/198 D, 520
See application file for complete search history.

(56) References Cited

U.S. PATENT DOCUMENTS

| | | | | |
|---|---|---|---|---|
| 5,832,950 A * | 11/1998 | Shimada | .......... | B60K 15/03519 137/202 |
| 5,954,082 A * | 9/1999 | Waldorf | .......... | B60K 15/03519 137/202 |
| 5,960,816 A * | 10/1999 | Mills | ................ | B60K 15/03519 137/202 |
| 6,003,539 A * | 12/1999 | Yoshihara | ........ | B60K 15/03519 137/202 |
| 6,675,779 B2 * | 1/2004 | King | ...................... | F02M 37/20 123/518 |
| 6,941,966 B2 * | 9/2005 | Mori | ................ | B60K 15/03519 137/202 |
| 7,143,639 B2 * | 12/2006 | Gobush | .............. | A63B 24/0006 73/65.03 |
| 7,207,347 B2 * | 4/2007 | Olshanetsky | ........... | F16K 17/36 137/202 |
| 7,770,593 B2 * | 8/2010 | Moses | .................. | B60K 15/035 137/202 |
| 7,913,671 B2 * | 3/2011 | Arnalsteen | ....... | B60K 15/03519 123/516 |
| 9,518,671 B2 * | 12/2016 | Sui | .......... | F16K 27/02 |
| 10,267,275 B2 * | 4/2019 | Mihara | .................. | F02M 37/20 |
| 2002/0124909 A1 * | 9/2002 | Groom | ............. | B60K 15/03519 141/192 |
| 2003/0189110 A1 * | 10/2003 | Kurihara | .......... | B60K 15/03519 239/533.2 |
| 2004/0003843 A1 * | 1/2004 | Sugiyama | ............. | F16K 24/044 137/202 |
| 2004/0221890 A1 * | 11/2004 | Takahashi | ............. | F16K 24/044 137/202 |
| 2006/0011234 A1 * | 1/2006 | Spink | .................... | F16K 24/044 137/202 |
| 2008/0092962 A1 * | 4/2008 | Theissler | ......... | B60K 15/03519 137/587 |
| 2009/0000669 A1 * | 1/2009 | Kito | ...................... | F16K 24/044 137/202 |

FOREIGN PATENT DOCUMENTS

| | | |
|---|---|---|
| KR | 20060102510 A | 9/2006 |
| KR | 20070083588 A | 8/2007 |
| KR | 100979843 B1 | 9/2010 |
| WO | WO2010075396 A2 | 7/2010 |

\* cited by examiner

FIG. 1A

BACKGROUND ART

FIG. 1B

BACKGROUND ART

FIG. 2

BACKGROUND ART

FILL LIMIT VENT VALVE FOR FUEL TANK

CROSS-REFERENCE TO RELATED APPLICATIONS

This application is a national phase claiming the benefit of and priority to International Patent Application No. PCT/KR2017/008232, entitled "FILL LIMIT VENT VALVE FOR FUEL TANK", filed Jul. 31, 2017, which claims priority to Japanese Patent Application No. 10-2016-0104998, filed Aug. 18, 2016, which are hereby incorporated by reference in their entireties.

TECHNICAL FIELD

Embodiments of the present invention relate to a fill limit vent valve (FLVV) for a fuel tank, the FLVV automatically closing an inlet of the fuel tank when a proper amount of fuel is fed into the fuel tank of a vehicle, and automatically closing an evaporative gas outlet when the fuel inside the fuel tank sloshes during travelling or the vehicle is turned over by a vehicle accident and, more particularly, to an FLVV for a fuel tank, the FLVV enabling secure sealing by minimizing movement through an improved structure of a float and a plate, enabling size optimization by applying the float and a plate in a half-moon shape, and improving re-opening performance by enabling the weight of the float and the plate to increase.

BACKGROUND ART

In general, a vehicle is driven using an explosive force and combustion heat generated when fuel such as gasoline or diesel is combusted by an engine, wherein a fuel tank is provided at a bottom part of a body of the vehicle, and a predetermined amount of fuel is supplied to the engine in a situation in which fuel is stored in the fuel tank.

In detail, a fuel device of a vehicle includes a fuel tank, a fuel feeding pipe, and a fuel pump. The fuel tank is formed of a steel plate, has a baffle plate provided therein to increase the stiffness and strength and simultaneously prevent sloshing of fuel, and is coated with tin or zinc for anti-corrosion treatment. A capacity of the tank is based on a daily consumption and thus, increases when an engine displacement increases.

The fuel feeding pipe is a passage of fuel, and is a stainless or steel pipe with a diameter of 25 to 42 mm, wherein fuel pipes are connected to each other, a connecting portion therebetween is clamped, a cap to open and close the fuel feeding pipe is detachably provided at the fuel feeding pipe, and a door to open and close the cap with respect to the fuel feeding pipe from outside is rotatably provided at an outer part of the body of the vehicle by means of a hinge.

Further, the fuel pump is a DC motor which is driven by receiving power from a storage battery and supplies an injector with fuel stored in the fuel tank, types of which include an external fuel pump provided at an engine room and an internal fuel pump provided in the fuel tank. However, an internal fuel pump which restricts noise of the fuel pump and prevents vapor lock and fuel pulsation is commonly used.

A fill limit vent valve (FLVV) is provided in the fuel tank, wherein external leakage of fuel or evaporative gas in the fuel tank is prevented by the FLVV when the vehicle is turned over.

That is, since fuel of vehicles is highly volatile, the fuel easily evaporates into gas when the air is at high temperature like summer. When the fuel tank is full of the evaporated gas, the internal pressure of the fuel tank increases, and thus there is a concern about leakage of the fuel or evaporative gas and the fuel tank may explode in case of a collision accident, which may expand damage.

Thus, a fuel supply system of a typical vehicle induces evaporative gas of a fuel tank with an intake pipe of an intake system and takes the evaporative gas along with the air into a cylinder and combusts the evaporative gas. The FLVV is provided in the fuel tank to prevent fuel permeation into an induction pipe caused by movements or an inclination of the body of the vehicle occurring when the vehicle is travelling.

Figure 1A:
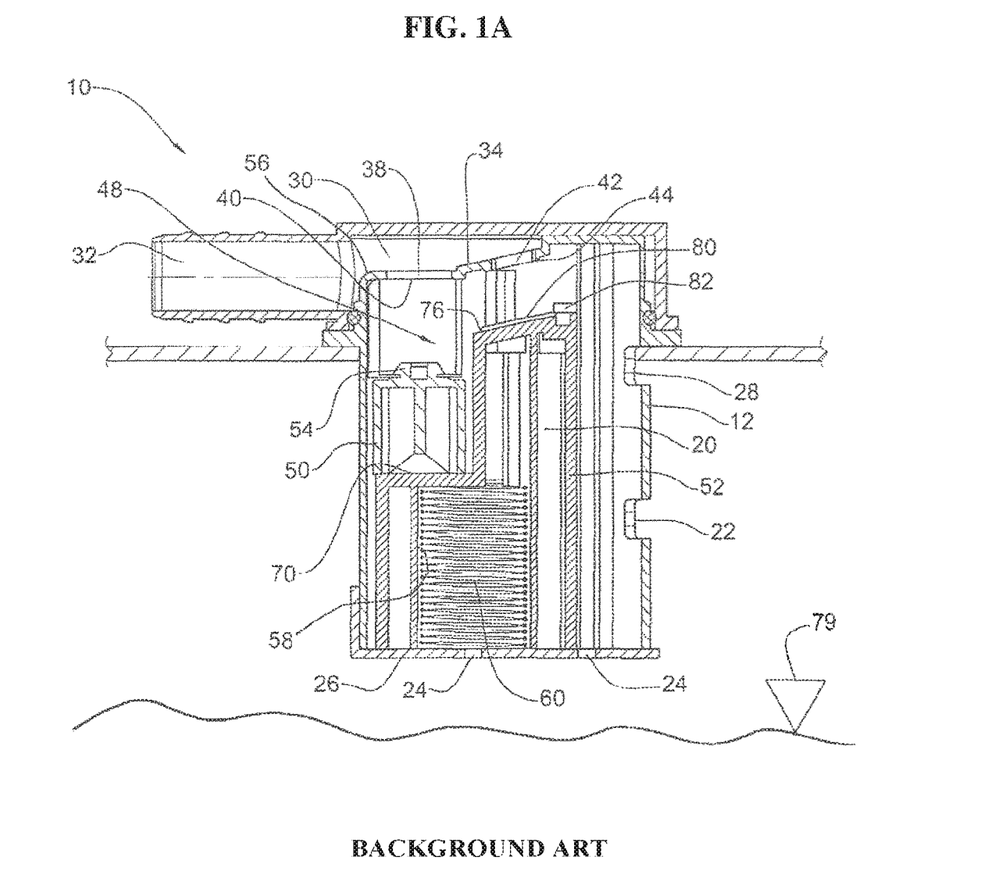
FIGS. 1A and 1B are longitudinal cross-sectional views illustrating an existing fill limit vent valve (FLVV).
Figure 1B:
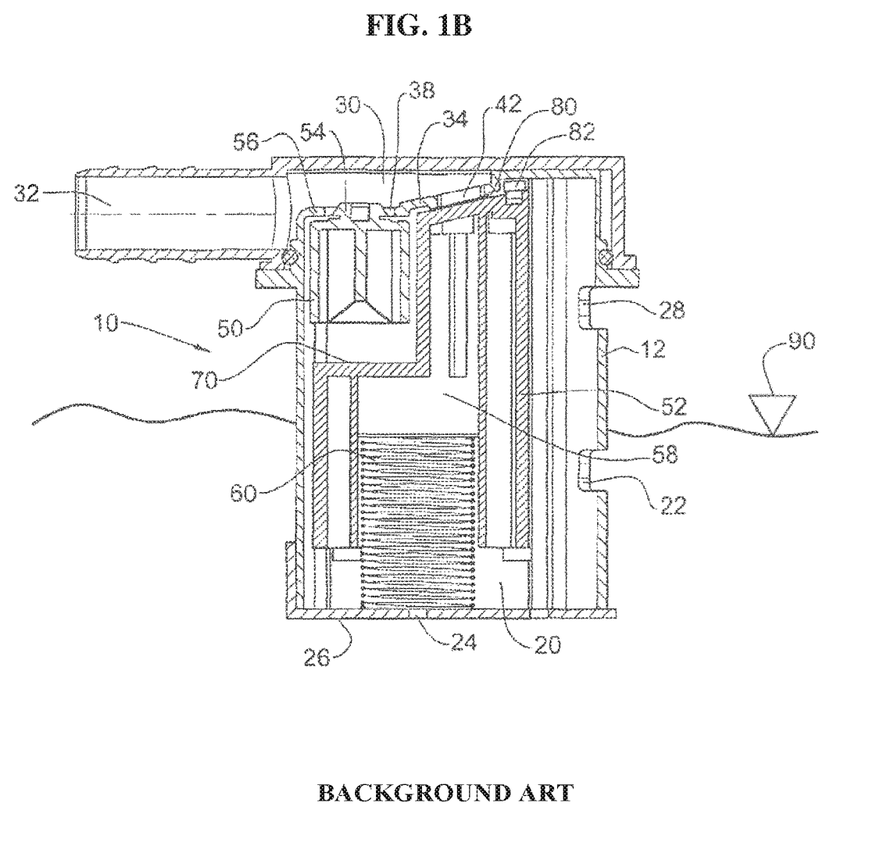
Figure 2:
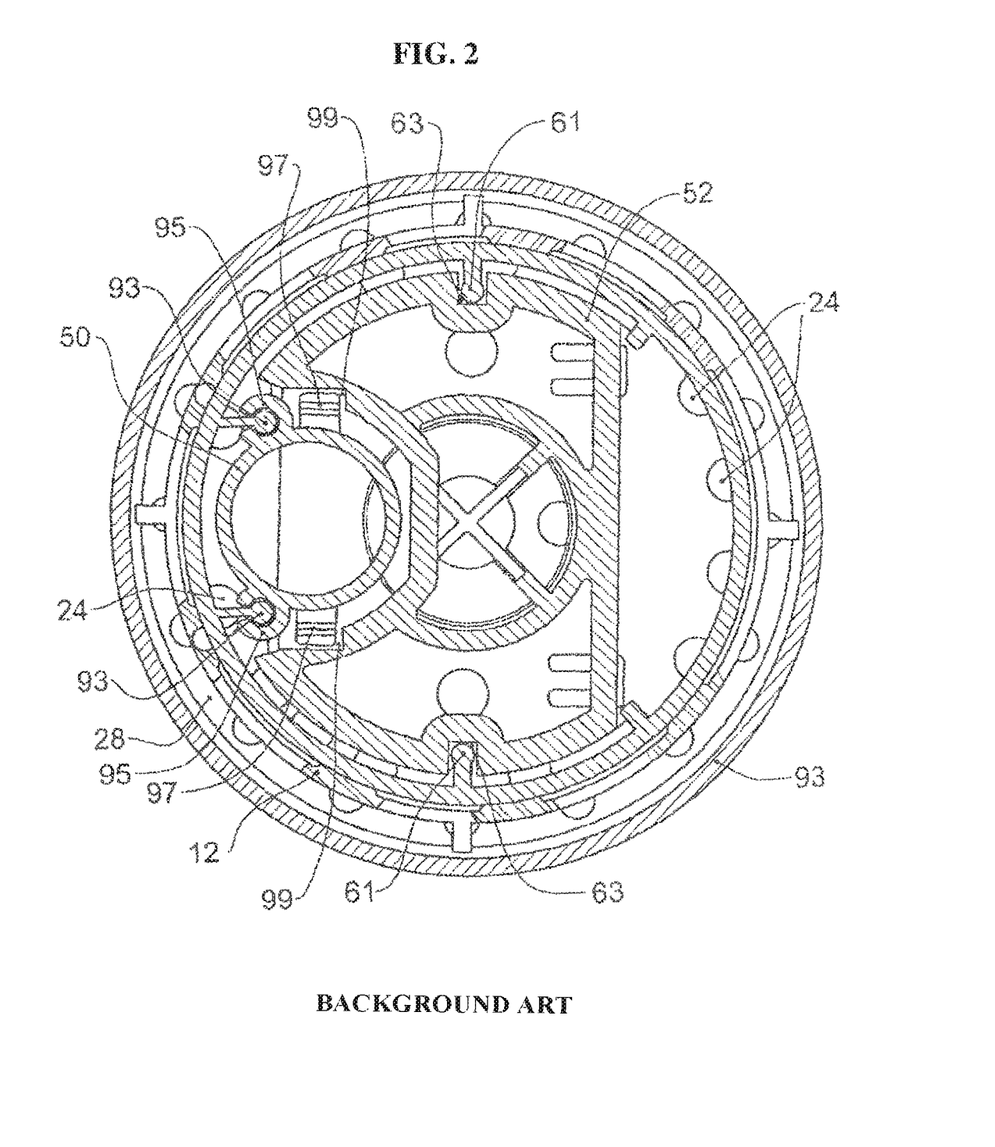
FIG. 2 is a cross-sectional view taken along a line A-A of FIG. 1A.

FIGS. 1A and 1B are longitudinal cross-sectional views illustrating an existing FLVV, and FIG. 2 is a cross-sectional view taken along a line A-A of FIG. 1A, wherein an existing valve 10 includes a housing 12 defining a confined space 20, several fluid inlets 24 at a bottom wall 26 of the housing, and an upper inlet port 28 at a top end of the confined space.

The valve 10 is formed at an upper portion thereof with a fluid outlet chamber 30 being in flow communication with an outlet duct 32 of the valve, wherein the fluid outlet chamber 30 is sealingly partitioned from the confined space 20 by a partition wall 34 formed with a first outlet port 38, bounded by a first valve seating 40, and a second outlet port 42, which is in the form of an elongate slit-like inlet aperture, bounded by a second valve seating 44 having an inclined bottom surface.

A valve assembly 48, which is axially displaceable within the confined space 20 and includes a first stage float member 50 associated with the first outlet port 38 and a second stage float member 52 associated to the second outlet port 42, is provided.

The first stage float member 50 has, at a top end thereof, a tapered projection with a resilient sealing member 56 mounted thereover, receivable within the first valve seating 40 for proper positioning in the first valve seating 40, and adapted for sealing engagement with the first valve seating 40 of the partition wall 34.

The second stage float member 52 is a double-walled float member defining an annular spring receptacle 58, supporting a coiled spring 60 bearing at a bottom end against the bottom wall of the housing and at its top end against a shoulder of the second stage float member 52.

The second stage float member 52 has a double decked top wall, a lower deck 70 extending at least partially below and sized for supporting the first stage float member 50 when the first stage float member 50 is at its opening position as in FIG. 1A, and an upper deck 76 formed with an inclined support surface which is inclined substantially equally as the bottom surface of the second valve seating 44 of the second outlet port 42.

A flexible closure membrane strip 80 is anchored at one end thereof by a spike 82, the purpose of which will become apparent hereinafter.

The first stage float member 50 is articulated to the second stage float member 52 by a retreating/anchoring arrangement to ensure that the first stage float member 50 disengages from the first valve seating 40 of the first outlet port 38.

As shown in FIG. 2, the housing 12 is fitted with a pair of axially extending rails, and fitted with an anti-splash skirt 93 enveloping the housing, wherein the first stage float member 50 is formed in turn with a pair of corresponding followers 95.

The first stage float member 50 is further fitted with a pair of lateral projections 97 slidingly received at corresponding grooves 99 formed in the second stage float member 52, and furthermore the housing 12 is formed with two radial inward projections 61 slidingly received within corresponding longitudinal grooves 63 formed in the second stage float member 52.

A fuel level 79 within the fuel tank indicates a position of a valve not reaching a bottom end of the valve assembly 48, namely, the bottom end of the second stage float member 52, and the valve is thus considered to be in its fully opened position, wherein the first stage float member 50 and the second stage float member 52 are in their downward position, that is, disengaged respectively from the first outlet port 38 and the second outlet port 42 [referred to as the "open position"].

At the absence of buoyancy and under the influence of gravity, the coiled spring 60 is depressed. In this position, fuel vapor is free to flow via fuel inlet apertures 22, 24, and 28 and through the confined space 20, and out through the first and second outlet ports 38 and 42, and then via the fluid outlet chamber 30 to the outlet duct 32, which is typically connected through suitable piping to a vapor treating/recovery device, typically, a canister (not shown).

It should be noted that the fuel inlet apertures 22 and 28 and at least the first outlet port 38 are of significantly large cross-sections so as to allow evacuation of fuel vapor also at high flow rates. This is an important character which plays a role during fuel filling.

With further reference to FIG. 1B, as a fuel level 90 increases within the fuel tank, fuel enters the confined space 20 of the valve via the fuel inlet apertures 22, 24, and 28, wherein the spring biasing force applied by the spring 60, together with the buoyancy acting on the second stage float member 52, tends to raise the valve assembly 48 consequently as the fuel level rises within the tank.

As the second stage float member 52 beings its ascend, it entails also displacement of the first stage float member 50 until the fuel level within the confined space 20 rises to a stage wherein both the first stage float member 50 and the second stage float member 52 are biased into an uppermost position and sealingly engage with the first and second outlet ports 38 and 42, respectively.

In the closed position as in FIG. 1B, the closure membrane strip 80 of the first stage float member 50 sealingly engages with the second valve seating 44 of the second outlet port 42, and the resilient sealing member 54 of the first stage float member 50 sealingly engages with the first valve seating 40 of the first outlet port 38.

In this position, the valve is in its so-called closed position, prohibiting liquid or vapor egress via the outlet ports toward the outlet chamber 30.

Typically, the second stage float member 52 is first to engage in a sealing position, and only shortly after the first stage float member 50 engages into its sealed position owing to buoyancy acting on the first stage float member 50.

Upon fueling, the valve engages into its sealed position of FIG. 1B, and pressure builds up within the fuel tank, resulting in fuel level raising within a filler neck of the fuel tank entailing cut-off of the filling assembly as a result of contact of a filling nozzle with fuel within the filler neck.

In the state as shown in FIG. 1B, an intermediate position, wherein the level within the confined space slightly drops, allowing displacement of the second stage float member 52 downward into its open position, that owing to absence of upwardly directed buoyancy and overcoming the upwardly directed biasing effect of the coiled compression spring 60, and resulting in corresponding displacements of the first stage float member 50 into its open position, that owing to a retracting cord (not shown), is reached.

Eventually, the first stage float member 48 continues to displace into its initial position as in FIG. 1A where it comes to rest over the lower deck 70 of the second stage float member 52.

PRIOR ART DOCUMENT (Patent Document 0001) KR Patent Publication No. 10-0979843 (registered on 2010.08.27.)

DISCLOSURE OF INVENTION

Technical Goals

However, the existing valve does not have a separate spring for restoration of the first stage float member and a structure to prevent lateral movements during upward and downward movements, and thus sealing of the first outlet seat is unstable and the weight of the first stage float member decreases when the height of the valve decreases, which causes a drop in the opening performance of the first outlet port.

To solve the above issues of the existing valve, an aspect of the present invention is directed to minimizing a phenomenon that a plate moves laterally when moving upward and downward and maximizing a sealing effect of the plate by configuring a valve with a float and the plate and applying a spring and a rail structure the plate.

Another aspect of the present invention is directed to enabling a spatial optimization by applying a half-moon shape to the float even when the size of the valve is reduced.

Still another aspect of the present invention is directed to easily detaching sealing rubber with a less load by extending the length of a leverage when the half-moon shape is applied.

Technical Solutions

According to an aspect of the present invention, there is provided a fill limit vent valve (FLVV) for a fuel tank, the FLVV an upper cover provided in the fuel tank and having an outlet duct, a casing coupled to the upper cover, a float which is elastically provided inside the casing so as to be movable upward and downward, has a first valve seat provided on an upper surface of one side thereof so as to open and close a first outlet port by principle of a lever, and has a recessed surface formed at one side of the upper surface thereof, a plate elastically provided by a second spring at the recessed surface formed at the float, so as to open and close a second outlet port while moving upward and downward, and a lower cover closing a lower part of the casing and having the float elastically provided by a first spring.

Effects

The present invention has various advantages over the existing valve as follows.

First, embodiments provide a structure in which an outward protrusion of a plate placed on a recessed surface of a float is inserted into a vertical slit of a division wall such that the plate moves upward and downward along with the float, or only the plate independently moves upward and downward, thereby improving the assembling and operating performance.

Second, embodiments enable the plate to stably move upward and downward without moving laterally by a guide protrusion and a vertical through-hole, thereby improving the sealing performance.

Third, embodiments enable spatial optimization by forming the recessed surface of the float and the plate provided at the recessed surface in a half-moon shape, thereby maximizing the weight of the float within a range not causing a pressure loss.

Fourth, embodiments elastically provide a third valve seat having a fine through-hole at an upper part of a first outlet port by a third spring and enable adjustment of an amount of additional fuel by adjusting an elasticity coefficient of the third spring, thereby facilitating an additional fuel amount adjusting task.

BEST MODE FOR CARRYING OUT THE INVENTION

Hereinafter, embodiments will be described in detail with reference to the accompanying drawings, such that those having ordinary skill in the art to which the present invention pertains may easily practice the present invention. The present invention may, however, be embodied in many different forms and should not be construed as being limited to the embodiments set forth herein. It is noted that the drawings are schematic, and are not illustrated based on actual scales. Relative dimensions and proportions of parts illustrated in the drawings are exaggerated or reduced in size for the purpose of clarity and convenience in the drawings, and any dimension is just illustrative but not restrictive. Further, the same reference numerals designate the same structures, elements or components illustrated in two or more drawings in order to exhibit similar characteristics.

Figure 3:
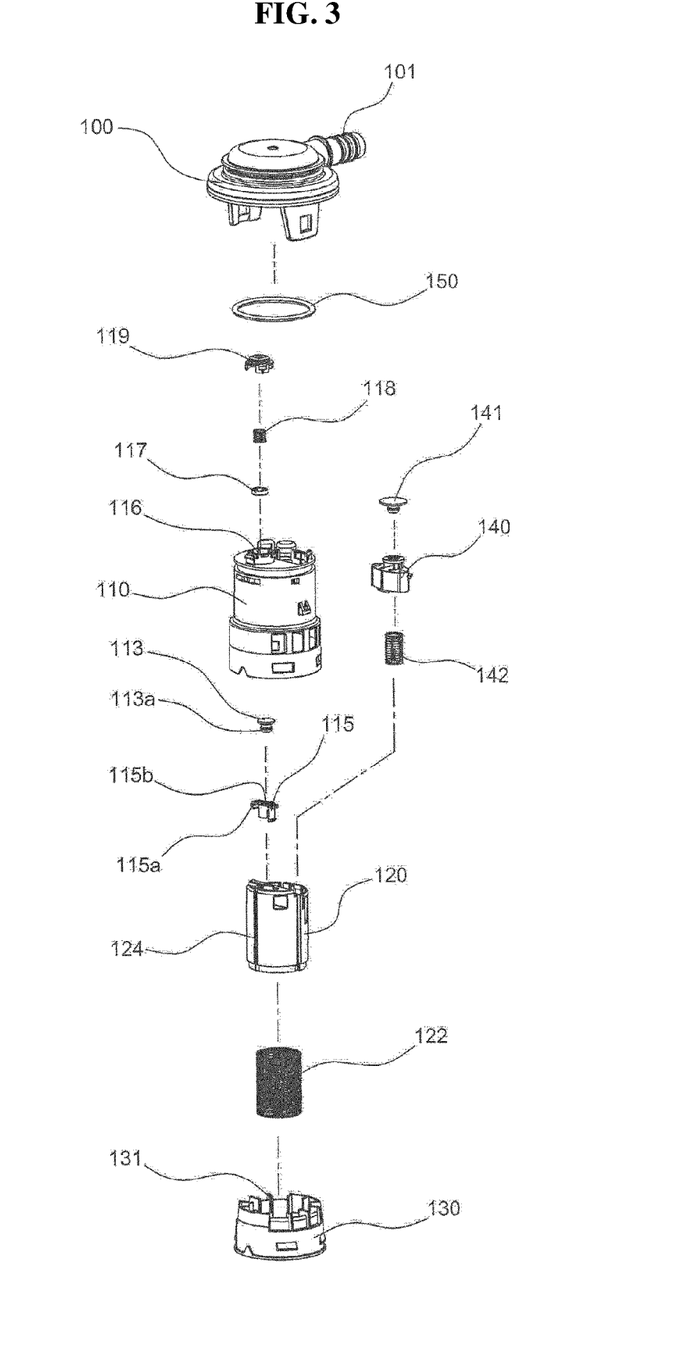
FIG. 3 is an exploded perspective view illustrating a configuration of the present invention.
Figure 4:
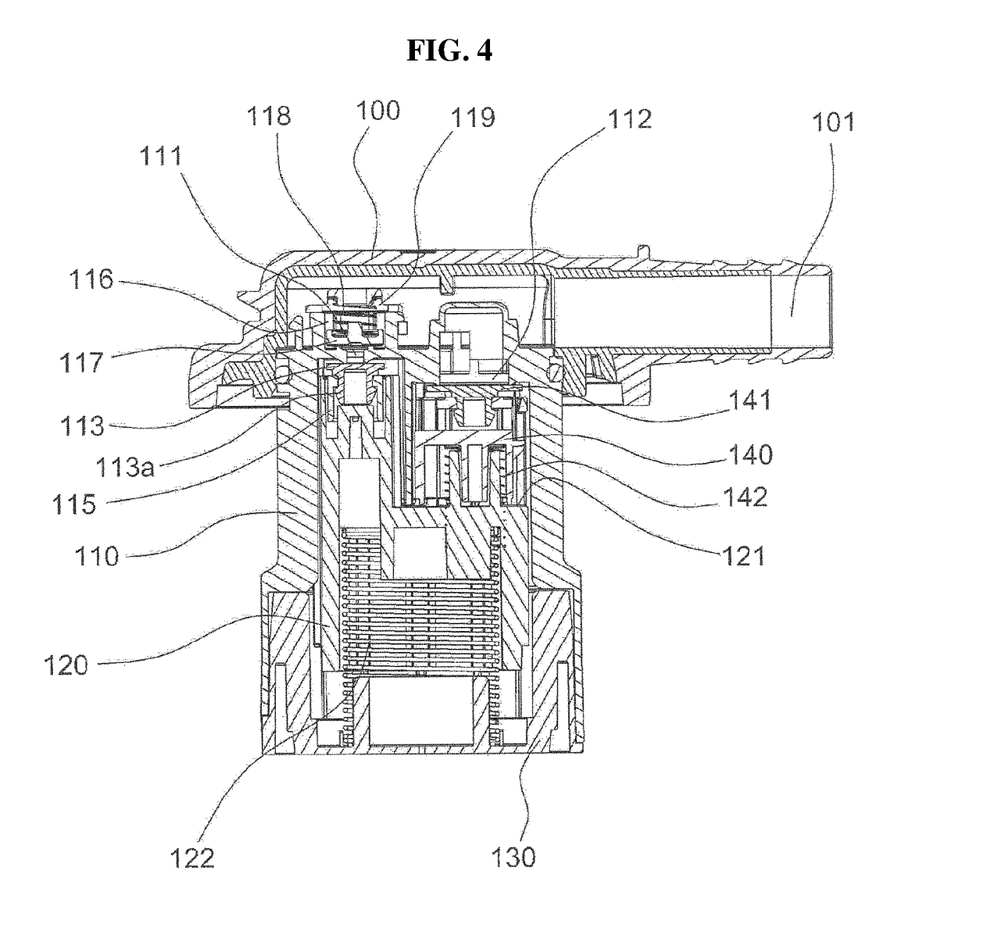
FIG. 4 is a longitudinal cross-sectional view illustrating an assembling state of FIG. 3.
Figure 5:
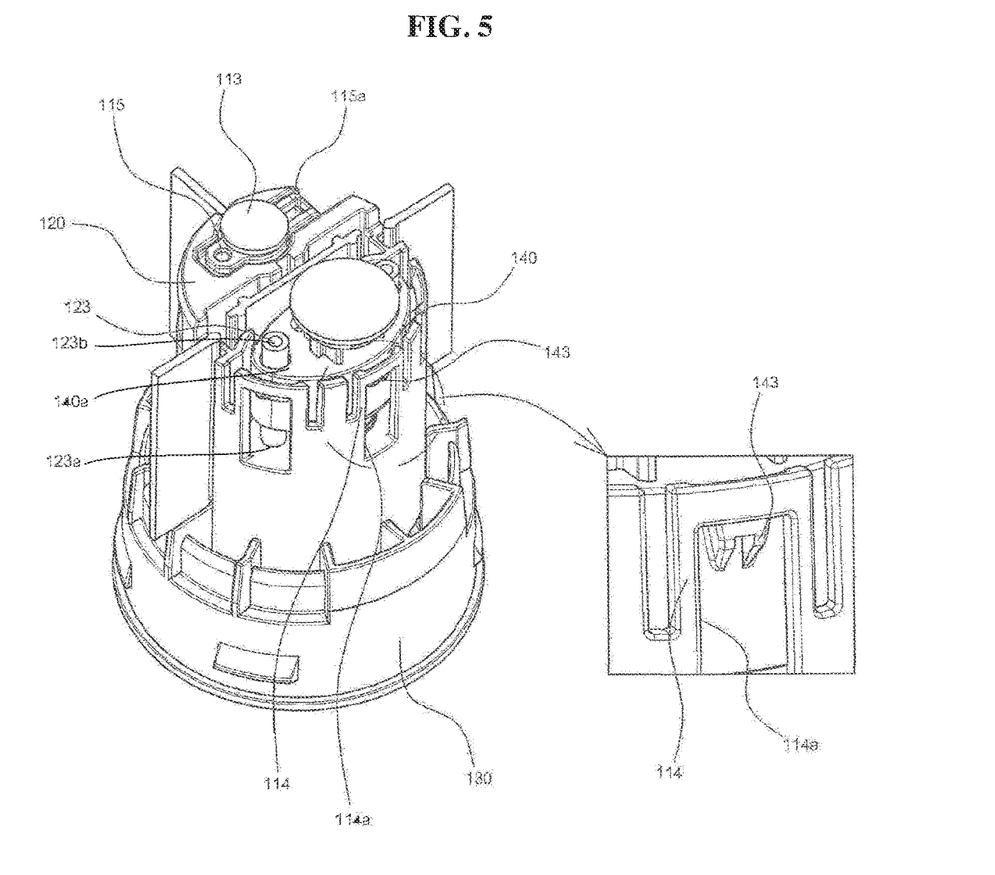
FIG. 5 is a perspective view illustrating a casing being decoupled from a lower cap of the present invention.

FIG. 3 is an exploded perspective view illustrating a configuration of the present invention, FIG. 4 is a longitudinal cross-sectional view illustrating an assembling state of FIG. 3, and FIG. 5 is a perspective view illustrating a casing being decoupled from a lower cap of the present invention, wherein an upper cover 100 having an outlet duct 101 is provided in a fuel tank (not shown), a float 120 having a recessed surface 121 on one side thereof is elastically provided by a first spring 122 inside a casing 110 coupled to the upper cover 100 so as to be movable upward and downward, and a lower part of the casing 110 is closed by a lower cap 130.

First and second outlet ports 111 and 112 are formed on a top of the casing 110 provided between the upper and lower caps 100 and 130, wherein the first outlet port 111 is configured to be opened and closed by the first valve seat 111 when the float 120 moves upward and downward, and the second outlet port 112 is configured to be opened and closed by a second valve seat 141 when a plate 140 moves upward and downward.

The present invention is directed to forming the recessed surface 121 in a half-moon shape at one side of the upper part of the float 120 elastically provided by the first spring 122 and providing the plate 140 having the second valve seat 141 in an assay shape at the recessed surface 121, thereby enabling the float 120 and the plate 140 to move upward and downward simultaneously, or enabling only the plate 140 to independently move upward and downward.

To this end, as shown in FIG. 5, a division wall 114 having a vertical slit 114a is formed at an outer side of the recessed surface 121 of the float 120, and an outward protrusion 143 to be inserted into the vertical slit 114a is formed at the plate 140, such that when the float 120 moves downward, the plate 140 also moves downward.

Further, for stable upward and downward movements in response to the plate 140 moving upward and downward, a first end 123a of a guide protrusion 123 is formed at the recessed surface 121 of the float 120 so that a second end 123b of the guide protrusion 123 protrudes upward above an upper surface 140a of the plate 140, and a vertical through-hole 145 into which the guide protrusion 123 is inserted is formed at the plate 140 such that the plate 140 does not move laterally when the plate 140 moves upward and downward.

Figure 6:
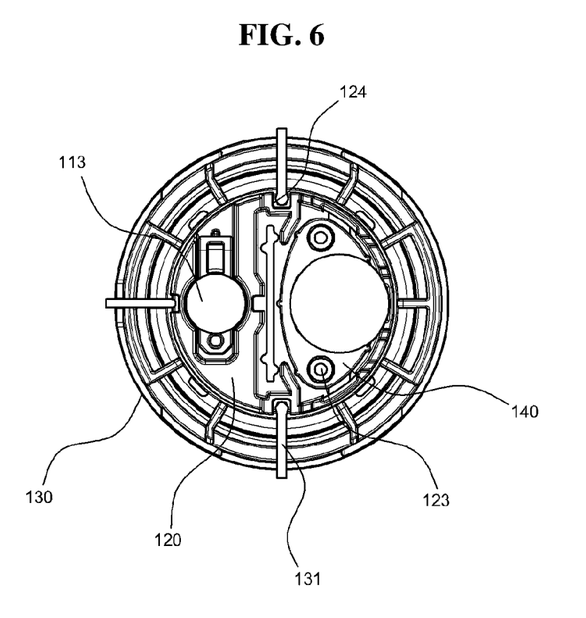
FIG. 6 is a top view of FIG. 5.

In addition, for stable upward and downward movements of the float 120, as shown in FIG. 6, two or more vertical projections 131 are formed at an inner surface of the lower cover 130, and vertical rails 124 into which the vertical projections 131 are inserted are formed at an outer circumferential surface of the float 120.

A first valve seat 113 is provided on an upper surface of one side of the float 120 so as to open and close the first outlet port 111 by principle of a lever 115 rotatably coupled to a top surface of the float 120 via a hinge 115a that is arranged or formed at one end of the lever 115.

An insertion hole 115b for assembling the first valve seat 113 is formed at the lever 115, and a projection 113a to be inserted into the insertion hole 115b by interference fit is formed at the valve seat 113.

Meanwhile, a receiving space 116 is formed at an upper part of the first outlet port 111 formed at the casing 110, and a third valve seat 117 having a fine through-hole (not shown) is elastically provided by a third spring 118 inside the receiving space 116 and also supported by a cap 119.

This is to adjust an amount of additional fuel to be automatically additionally fed by adjusting an elasticity coefficient of the third spring 118.

In the drawings, the reference numeral 150 not described denotes an O-ring for maintaining an airtightness between the upper cover 100 and the casing 110.

An action of the present invention is described below.

Figure 7A:
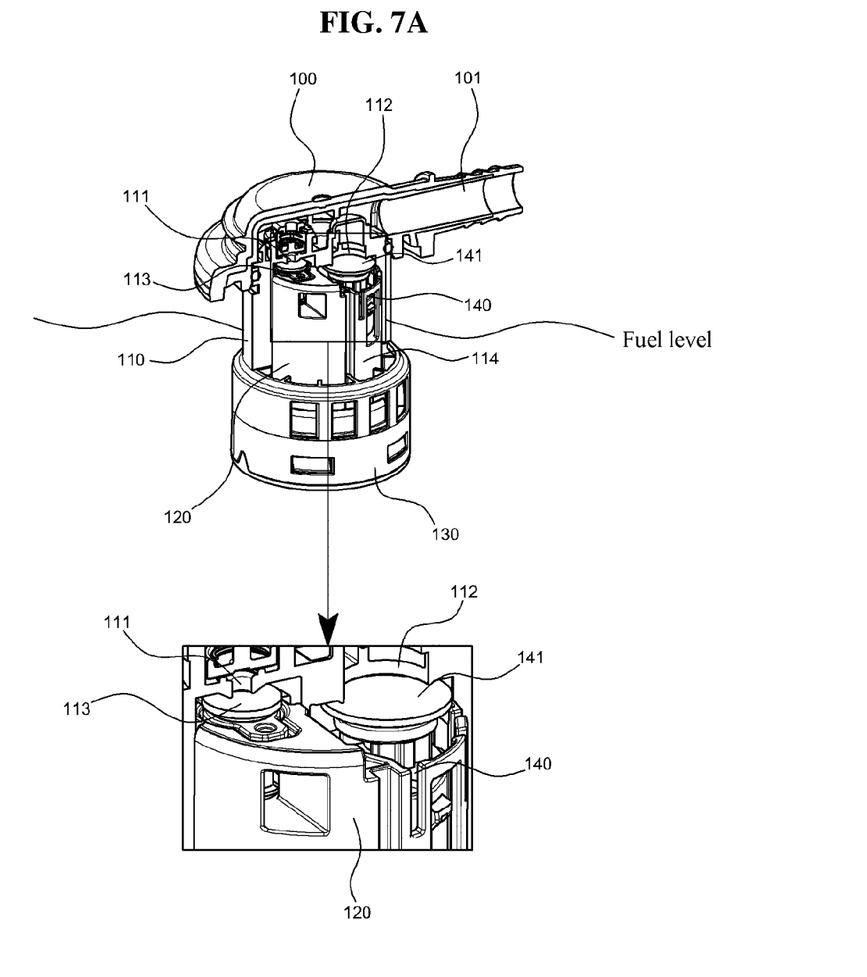
FIGS. 7A through 7C are perspective views with partial cross-sections illustrating an operation state of the present invention, FIG. 7A illustrating a state of feeding fuel with first and second outlet ports being all opened, FIG. 7B illustrating a state of being full of the fuel with the first outlet port being opened and the second outlet port being closed, and FIG. 7C illustrating a state of closing the first outlet port by a first valve seat in response to sloshing of the fuel.

First, as shown in FIG. 7A, when the fuel within the fuel tank is exhausted, the float 120 moves downward to a bottom dead center by its self-weight. In this example, since the vertical rails 124 are formed at the outer circumferential surface of the float 120 and the vertical projections 131 to be inserted into the vertical rails 124 are formed at the lower cover 130, the float 120 stably moves downward.

In addition, since the outward protrusion 143 of the plate 140 is inserted into the vertical slit 114a of the float 120, the plate 140 is displaced at the bottom dead center along with the float 120 such the first and second outlet ports 111 and 112 are opened at the same time.

As described above, when the float 120 moves downward, the first valve seat 113 opens the first outlet port 111 with a relatively less force since the length of the lever 115 provided at the upper part of the float 120 is far greater than that of the existing valve.

Furthermore, the plate 140 provided at the recessed surface 121 of the float 120 so as to be movable upward and downward does not move laterally by the guide protrusion 123 and the vertical through-hole 145 and thus, stably moves downward.

As described above, in a state in which the plate 140 is displaced at the bottom dead center along with the float 120 and the first and second outlet ports 111 and 112 are all opened, fuel filling is possible.

Figure 7B:
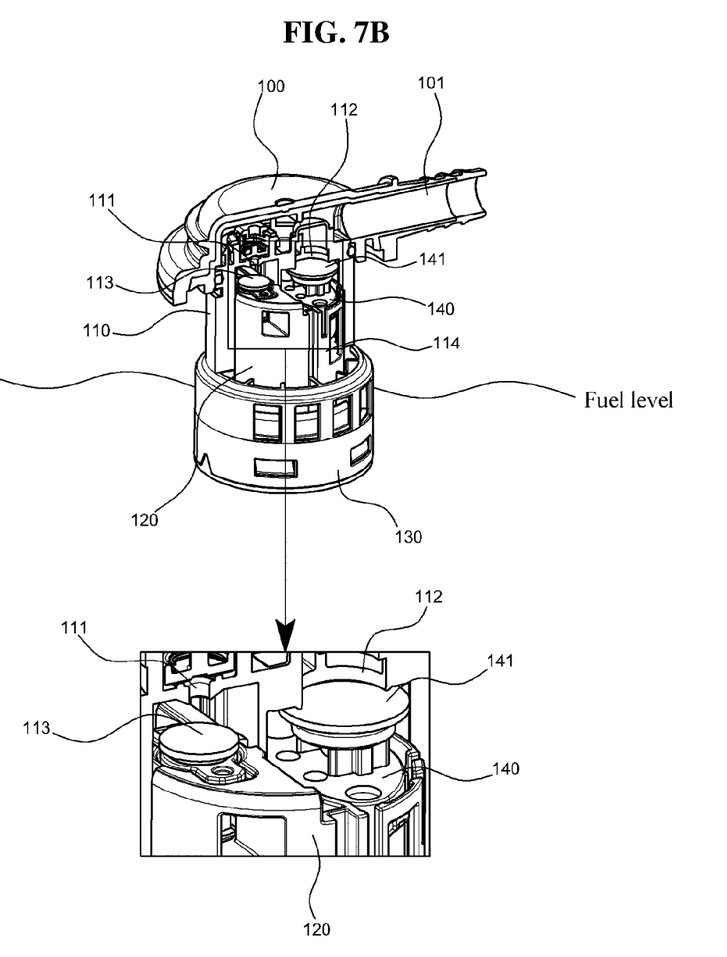

Accordingly, when a driver starts fuel filling with a nozzle (not shown) of a lubricator inserted into a filling hole, the fuel tank is filled with fuel and the plate 140 gradually moves upward, wherein the plate 140 stably moves upward without moving laterally by the two rail structures as described above and closes the second outlet port 112 as shown in FIG. 7B. Thus, fuel filling is not possible any further, but the pressure within the fuel tank is adjustable since the float 120 opens the first outlet port 111.

Figure 7C:
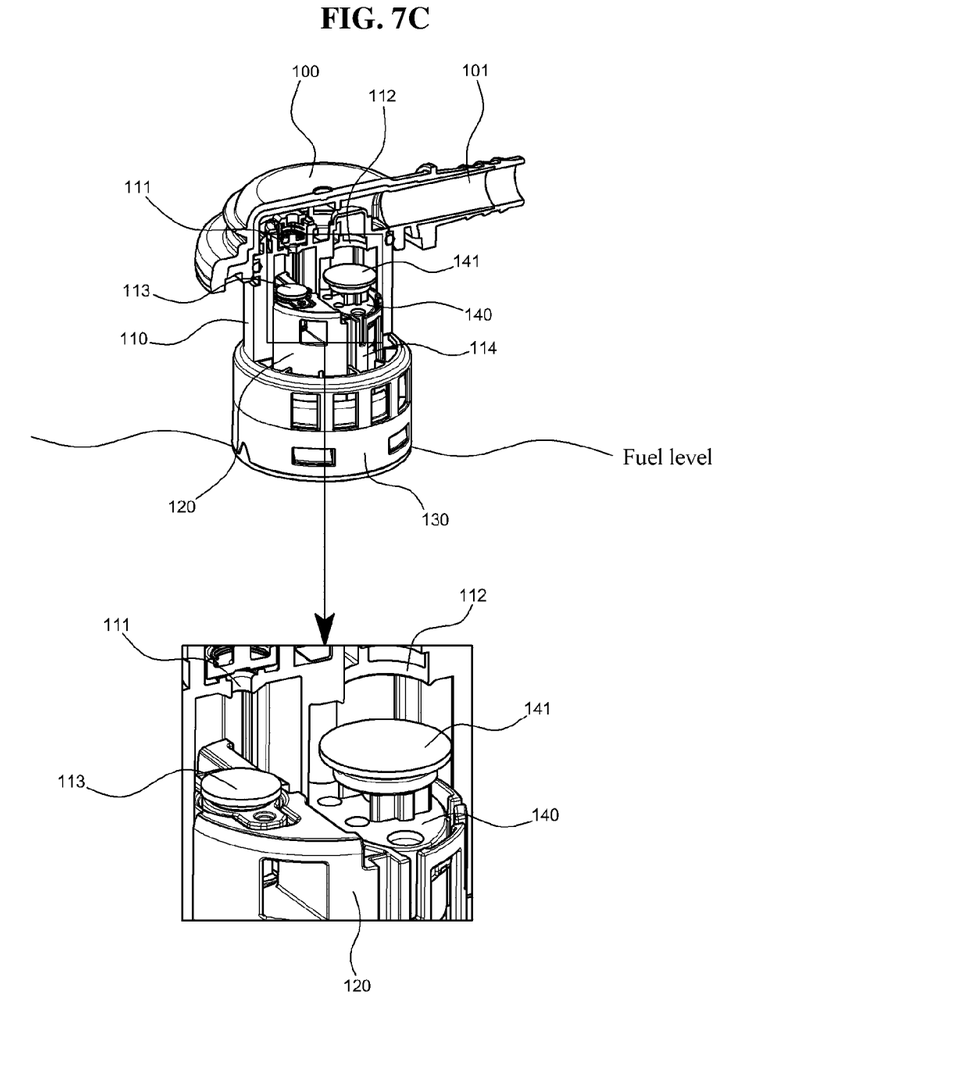

As described above, FIG. 7B illustrates a state in which fuel filling is completed and the vehicle is ready to travel. When the fuel within the fuel tank sloshes due to pathholes on a road or sudden braking during travelling and the float 120 moves upward as shown in FIG. 7C, the first valve seat 113 provided at the top part of the float 120 moves upward by a restoring force of the first spring 122 and quickly closes the first outlet port 111, thus a discharge of the fuel through the first outlet port 111 is prevented.

Meanwhile, when the travelling is continued and stabilized, the float 120 having risen in response to the sloshing of the fuel returns to its initial position as shown in FIG. 7B, and the first valve seat 113 closing the first outlet port 111 moves downward by the lever 115 and opens the first outlet port 111. Thus, evaporative gas of a predetermined or higher pressure is discharged through the outlet duct 101, whereby the internal pressure of the fuel tank is maintained at a preset level.

Even though embodiments of the present invention have been described above with reference to the accompanying drawings, those skilled in the art may understand that the embodiments may be implemented in other specific embodiments without changing the technical spirit or essential features.

Accordingly, the aforementioned embodiments are only examples in every aspect and thus, are to be understood not to be limitative. The range of the present invention is to be defined by the claims rather than by the detailed description. All of the modifications or modified forms induced from the meaning and range of the claims and the equivalents thereof are to be interpreted to be included within the scope of the present invention.

DESCRIPTION OF REFERENCE NUMERALS

11: Casing
100: Upper cover
101: Outlet duct
111: First outlet port
112: Second outlet port
113: First valve seat
115: Lever
117: Third valve seat
120: Float
121: Recessed surface
122: First spring
123: Guide protrusion
124: Vertical rail
130: Lower cover
131: Vertical projection
140: Plate
141: Second valve seat
142: Second spring
143: Outward protrusion
145: Vertical through-hole

The invention claimed is:

1. A fill limit vent valve (FLVV) for a fuel tank, the FLVV comprising:
an upper cover having an outlet duct,
a casing coupled to the upper cover,
a float elastically provided inside the casing so as to be movable upward and downward by a first spring, wherein the float has a first valve seat provided on a first side of an upper surface of the float so as to open and close a first outlet port by a lever, and wherein the float has a recessed surface formed at a second side different from the first side of the upper surface of the float,
a plate elastically provided at the recessed surface so as to be movable upward and downward by a second spring independent of a movement of the float by the first spring, wherein the plate has: (i) a second valve seat so as to open and close a second outlet port when the plate moves upward and downward and (ii) a vertical through-hole,
a lower cover closing a lower part of the casing and having the float elastically provided by the first spring, and
a guide protrusion provided and inserted into the vertical through-hole such that a first end of the guide protrusion is positioned at the recessed surface of the float and a second end of the guide protrusion protrudes upward above an upper surface of the plate.

2. The FLVV of claim 1, wherein an insertion hole for assembling the first valve seat is formed at the lever of the float, and a projection to be inserted into the insertion hole by interference fit is formed at the first valve seat.

3. The FLVV of claim 1, wherein a receiving space is formed at an upper part of the first outlet port formed at the casing, and a third valve seat having a through-hole, the third valve being elastically provided by a third spring inside the receiving space and also supported by a cap.

4. The FLVV of claim 1, wherein a division wall having a vertical slit is formed at an outer side of the recessed surface formed at the float, and an outward protrusion to be inserted into the vertical slit is formed at the plate.

5. The FLVV of claim 1, wherein two or more vertical projections are formed at an inner surface of the lower cover, and vertical rails into which the vertical projections are inserted are formed at an outer circumferential surface of the float.

* * * * *